(12) United States Patent  
Hofman et al.

(10) Patent No.: US 7,394,468 B2  
(45) Date of Patent: Jul. 1, 2008

(54) CONVERTED DIGITAL COLOUR IMAGE WITH IMPROVED COLOUR DISTINCTION FOR COLOUR-BLINDS

(75) Inventors: Paul M. Hofman, Nuenen (NL); Waldo Ruiterman, Appingedam (NL); Frederik G. Heeman, Venlo (NL)

(73) Assignee: Océ-Technologies B.V., Venlo (NL)

( * ) Notice: Subject to any disclaimer, the term of this patent is extended or adjusted under 35 U.S.C. 154(b) by 745 days.

(21) Appl. No.: 10/786,066

(22) Filed: Feb. 26, 2004

(65) Prior Publication Data

US 2004/0212815 A1    Oct. 28, 2004

(30) Foreign Application Priority Data

Feb. 28, 2003    (EP) ................................. 03075671

(51) Int. Cl.
| | |
|---|---|
| G06T 11/00 | (2006.01) |
| G09G 5/00 | (2006.01) |
| G06K 15/00 | (2006.01) |
| G06K 9/00 | (2006.01) |
| H04N 1/60 | (2006.01) |
| G09G 7/00 | (2006.01) |
| H04N 1/56 | (2006.01) |

(52) U.S. Cl. ..................... 345/589; 345/581; 345/591; 345/618; 358/1.9; 358/3.24; 358/518; 358/3.01; 382/162; 382/274; 382/165; 382/167

(58) Field of Classification Search ................. 345/426, 345/428, 581, 589–594, 597, 617–620, 600, 345/690; 382/162–167, 114, 274; 358/1.16, 358/3.02, 1.18, 518, 537, 1.9, 3.24, 3.27, 358/3.01

See application file for complete search history.

(56) References Cited

U.S. PATENT DOCUMENTS 5,729,360 A * 3/1998 Kita et al. .................... 358/500

6,128,407 A * 10/2000 Inoue et al. ................... 382/167  
6,473,521 B1 * 10/2002 Hino ............................ 382/164  
6,784,973 B1 * 8/2004 Wozniak et al. ............... 355/40

(Continued)

FOREIGN PATENT DOCUMENTS

EP    0 680 201 A2    11/1995

(Continued)

OTHER PUBLICATIONS

Tao et al. "Color image edge detection using cluster analysis", Proceedings of the International Conference on Image Processing, Oct. 26-29, 1997, vol. 1, p. 834-836.*

(Continued)

*Primary Examiner*—Wesner Sajous  
(74) *Attorney, Agent, or Firm*—Birch, Stewart, Kolasch & Birch, LLP

(57) ABSTRACT

A method is provided for converting a digital colour image to a digital colour image with improved colour distinction. This method improves the colour distinction in a colour image for an observer suffering from a colour-blindness. The method includes defining a number of main colour values of a received digital colour image, converting the main colour values to converted main colour values such that the converted main colour values are perceived as distinguishable from each other by a colour-blind observer, and rendering the digital colour image with the converted main colour values.

23 Claims, 6 Drawing Sheets

U.S. PATENT DOCUMENTS

| | | | |
|---|---|---|---|
| 2002/0135788 A1* | 9/2002 | Arakawa et al. | 358/1.1 |
| 2003/0044062 A1* | 3/2003 | Ganapathy et al. | 382/165 |
| 2003/0058475 A1* | 3/2003 | Hofman | 358/3.01 |
| 2004/0041924 A1* | 3/2004 | White et al. | 348/239 |
| 2004/0223641 A1* | 11/2004 | Koyama et al. | 382/162 |
| 2007/0041619 A1* | 2/2007 | Harrington et al. | 382/112 |
| 2007/0091113 A1* | 4/2007 | Jones et al. | 345/592 |

FOREIGN PATENT DOCUMENTS

| | | |
|---|---|---|
| EP | 11-175050 A | 7/1999 |
| EP | 2000-306074 A | 11/2000 |

OTHER PUBLICATIONS

Vischeck, (Mar. 29, 2002), pp. 1-8, XP002248494.

Yu-Chuan Shen et al., *Chinese J. Med. Biol. Eng.*, vol. 16, No. 1, (Mar. 1996), pp. 61-83.

Hans Brettel et al., *J. Opt. Soc. Am. A.*, vol. 14, No. 10, (Oct. 1997), pp. 2647-2655.

Christine Rigden, *British Telecommunications Engineering*, vol. 17, (Jan. 1999), pp. 2-6.

* cited by examiner

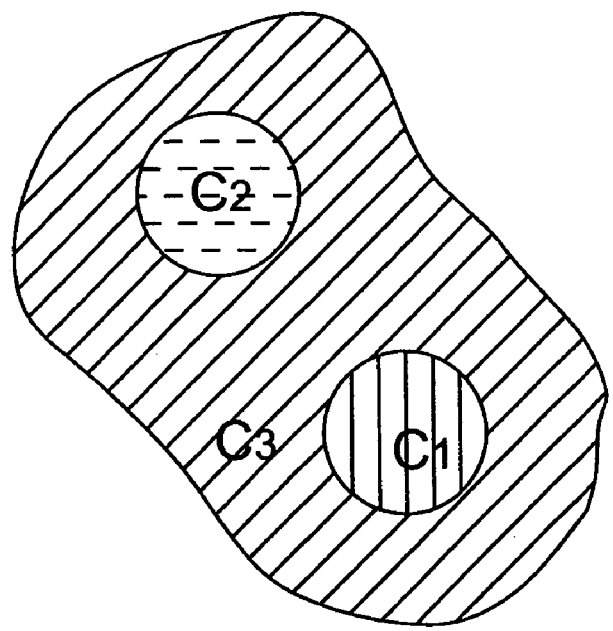
Fig 1.A
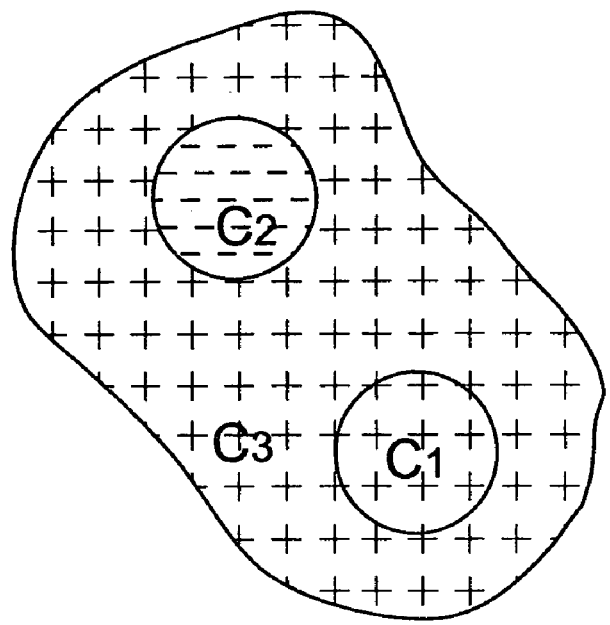
Fig 1.B

CONVERTED DIGITAL COLOUR IMAGE WITH IMPROVED COLOUR DISTINCTION FOR COLOUR-BLINDS

The present application claims, under 35 U.S.C. § 119, the priority benefit of European Patent Application No. 03075671.2 filed Feb. 28, 2003, the entire contents of which are herein fully incorporated by reference.

BACKGROUND OF THE INVENTION

1. Field of the Invention

The invention relates to a method of converting a digital colour image to a digital colour image with improved colour distinction, and more particularly to a method of this kind suitable for improving colour distinction in a colour image for an observer suffering from a type of colour-blindness.

2. Discussion of the Related Art

People suffering from colour-blindness may encounter difficulties with certain documents containing colours. Pie charts, histograms, maps, etc. can be unreadable for these people. A good design of software or web pages should consider the fact that colour-blind computer users see things differently than most users, as taught by an article entitled "The Eye of the Beholder—Designing for Colour-Blind Users" by C. Rigden in British Telecommunications Engineering, Vol. 17, 443-451 (1999). A method described therein consists in representing images as perceived by people with a certain colour deficiency and using the representation as a check after the conception of the document. In order to perform the check, use is made of transformed colour palettes in which each colour of a web-safe palette has been transformed to a colour value as perceived by a colour-blind person. That way, designers can produce documents, software interfaces and web pages which avoid problems for their users. However, this kind of adapted design is seldom applied in reality. Moreover, it has the disadvantage that the design is optimized for the most common deficiency with red and green, while other deficiencies receive less attention.

When colours in a document are used as primary means of information, this can become an issue for colour-blind people. Changing the colours of such existing documents in a given way may enable the colour-blind people to distinguish some colours which would be otherwise perceived mainly equally by them. After such transformation, these documents may be printed or displayed on a screen, by which these people can retrieve the information contained in the original colours.

A method of correcting a digital image for colour-blinds is known from Vischeck (www.vischeck.com/daltonize/). In this method, an image processing algorithm is used to improve the situation of people with a colour deficiency. The Vischeck algorithm is a combination of the following steps:
the red/green contrast in the image is increased;
the information conveyed by variations in the red/green direction is analyzed and converted into changes in brightness; and
the information conveyed by variations in the red/green direction is analyzed and converted into changes in blue/yellow coloration.

One step of the Vischeck algorithm makes the red/green variations somewhat more visible to colour-blinds, since many of these people posses some residual red/green discrimination. Another step according to this algorithm performs a mapping of some information contained in the document from an invisible colour dimension for colour-blinds into a colour dimension that they can see.

The Vischeck algorithm, however, has the inconvenience that the type of correction has to be given by hand by the user, meaning that the user has to give for each of the steps of the algorithm a numerical value. This makes the use of the algorithm cumbersome for a user who does not know which values apply to him. Even after a lot of trials, the improvement is still not convincing due to a lack of performance of the algorithm. There are also situations in which this algorithm does not work, meaning that the colour-blind user still may not be able to retrieve correctly the information contained in the document.

SUMMARY OF THE INVENTION

These and other problems are solved by the present invention which provides a method of converting a digital colour image to a converted digital image using an algorithm. This algorithim is executable by running a computer program and includes the steps of: defining a number of main colour values of the digital colour image; converting the main colour values to converted main colour values such that the converted main colour values are perceived mainly distinguishable from each other by an observer; and rendering the digital colour image with the converted main colour values.

An important benefit of the method according to the invention is that the conversion adapts to the image since main colour values are determined for each image to be converted. The transformation is not a fixed colour conversion and it is made such that converted main colour values are rendered distinguishable to the user. The conversion of the colours in an image does not have to be global, as long as main colours are distinct from each other to the colour-blind observer after transformation. Such an algorithm has the benefit of simplicity of use. The converted digital colour image can be rendered on a print or be displayed on a display screen, like a computer screen or a television screen.

In one embodiment of the method of converting a digital colour image according to the invention, the algorithm further comprises the step of determining the type of colour-blindness the observer is suffering from. That way, the image conversion can be even better adapted to the colour deficiency of the user.

It is preferred that the main colour values are determined by a cluster analysis of the colours of the image to be converted, a main colour value being a representative of the colour values comprised in a cluster. Cluster analysis is a convenient way of analysing the colours of a digital image. The clustering process may take place in any colour space, for example in the L*a*b* colour space, being preferred because it is a perceptual linear space.

According to a further embodiment of the method of converting a digital colour image according to the invention, the colour values comprised in a cluster are converted to converted cluster colour values. In a colour space, some colour values appear in the shape of clouds around a main colour value. The benefit of using a cluster conversion is that the processing speed can be increased since a relatively simple conversion can be used for the colour values comprised in a cluster, while the conversion of main colour values is done with care in order to obtain an optimized image for a user having a colour deficiency.

Preferably, the distribution of the main colour values with respect to confusion lines in at least a part of a colour space is taken into consideration for converting the main colour values, each of the confusion lines comprising colour values which are perceived as mainly indistinguishable from each other by an observer suffering from a type of colour-blindness. Taking the confusion lines into consideration leads to a conversion of a digital image being very well adapted to the type of colour-blindness of the observer because such confusion lines reflect quite precisely the way colour-blind people perceive colours. For example, a representation of confusion lines in the CIE Yu*v* colour space is convenient, as shown in the article by C. Rigden.

According to a further embodiment of the method of converting a digital colour image according to the invention, the distribution of the converted main colour values with respect to the confusion lines is such that not more than one converted main colour value is allocated on a confusion line. This is an easy way to ensure that the converted main colour values are perceived mainly distinguishable from each other by the colour-blind observer.

The invention particularly provides a method of converting a digital colour image wherein the conversion of the main colour values is done according to a conversion function which allocates to an angle formed between a reference confusion line and a line connecting a main colour value to a confusion point, being a point where the confusion lines intersect, a converted angle, being the angle between the reference confusion line and a line connecting the corresponding converted main colour value to the confusion point. This method of converting main colour values works particularly well and is easy to implement.

Further, the algorithm of the present method can be such that the original angle sequence of the main colour values is maintained for the converted main colour values. This has the advantage that, even after the conversion, the image may remain quite natural to the observer having a colour deficiency, in the sense that it remains quite close to the type of vision the person is used to.

According to a further embodiment of the method of converting a digital colour image of the invention, the conversion function is dependent on an image type, recognized by analysing the distribution of the main colour values. This enables an appropriate treatment of each image type with special parameters.

In a further embodiment of the method of converting a digital colour image according to the invention, the conversion function allocates a weight to each main colour value, depending on the number of colour points present in the cluster having said main colour value as representative, which weight determines the type of conversion applied to each main colour value. That way, the size of the cluster can be taken into account. For example, a relatively large cluster should have a relatively large influence on the final cluster positions.

Further, the lightness of the converted main colour values may be such that the contrast between the converted main colour values is optimized for the observer suffering from a type of colour-blindness. This may enable the colour-blind user to distinguish the converted colours even better.

The invention also relates to an apparatus for converting a digital colour image to a digital colour image with improved colour distinction for an observer suffering from a type of colour-blindness, the apparatus being provided with a memory for storing a digital colour image and a processing unit for processing digital data wherein the conversion method according to the invention is applied. The invention further relates to a computer program embodied on a computer-readable medium and having a program code for converting a digital colour image to a digital colour image with improved colour distinction for an observer suffering from a type of colour-blindness in accordance with the method of the invention. The invention relates also to a printer provided with a network connection unit for receiving externally generated print orders, a processing unit for processing digital image data and a printing unit, wherein the processing unit is provided with an apparatus to which the conversion method according to the invention is applied. The invention further relates to an image display device provided with a display screen, and a processing unit for processing digital image data, wherein the conversion method according to the invention is applied.

BRIEF DESCRIPTION OF THE DRAWINGS

The invention will now be explained with reference to the following exemplified embodiment of the present invention, and illustrated by reference to the drawings. This embodiment serves to illustrate the invention and should not be regarded as a limitation thereof.

FIG. 1A is an example of a colour image such as a digital colour image;

FIG. 1B illustrates how the colour image is perceived by an observer suffering from a type of colour-blindness;

DETAILED DESCRIPTION OF THE PREFERRED EMBODIMENTS

Human vision of colours is achieved via photosensitive cells in the eye, the rods and cones. The rods are used for the perception of lightness while the cones are used for trichromatic vision. Each of the three types of cones is used for the perception of a particular band of light spectrum, with sensitivity peaks situated around red, green or blue wavelengths.

When one of these cone types is missing, a person is a dichromat. Most of the times, the red sensitive or the green sensitive cones are missing. It can also happen that the receiving band of light spectrum of the red-sensitive cones is shifted towards green, or the other way around. In this case, a person with such a vision is said to be anomalous trichromat. Finally there is a very small group of people who perceive no colour at all, only lightness.

About eight percent of Caucasian men are colour blind. This is made up of 1% red-blind (protanope) and 1.1% green-blind (deuteranope) dichromats and of 1% red-insensitive (protanomolous) and 4.9% green-insensitive (deuteranomolous) trichromats. Only 0.4% of women have any sort of colour vision deficiency.

A colour vision deficiency can affect how one perceives any colour that contains an amount of red or green. This problem is illustrated in FIGS. 1A and 1B. The colours $C_1$, $C_2$ and $C_3$ shown in FIG. 1A are distinguishable for a person having a normal colour perception. FIG. 1B represents how a person with a type of colour blindness perceives the same image. Due to a colour vision deficiency, for example of a protanope person, colours $C_1$ and $C_3$ are rendered indistinguishable from each other by the colour blind person. When important information is contained in these colours, this can be quite a problem for the observer (colour blind person) who will miss at least a part of the document's content.

Figure 2:
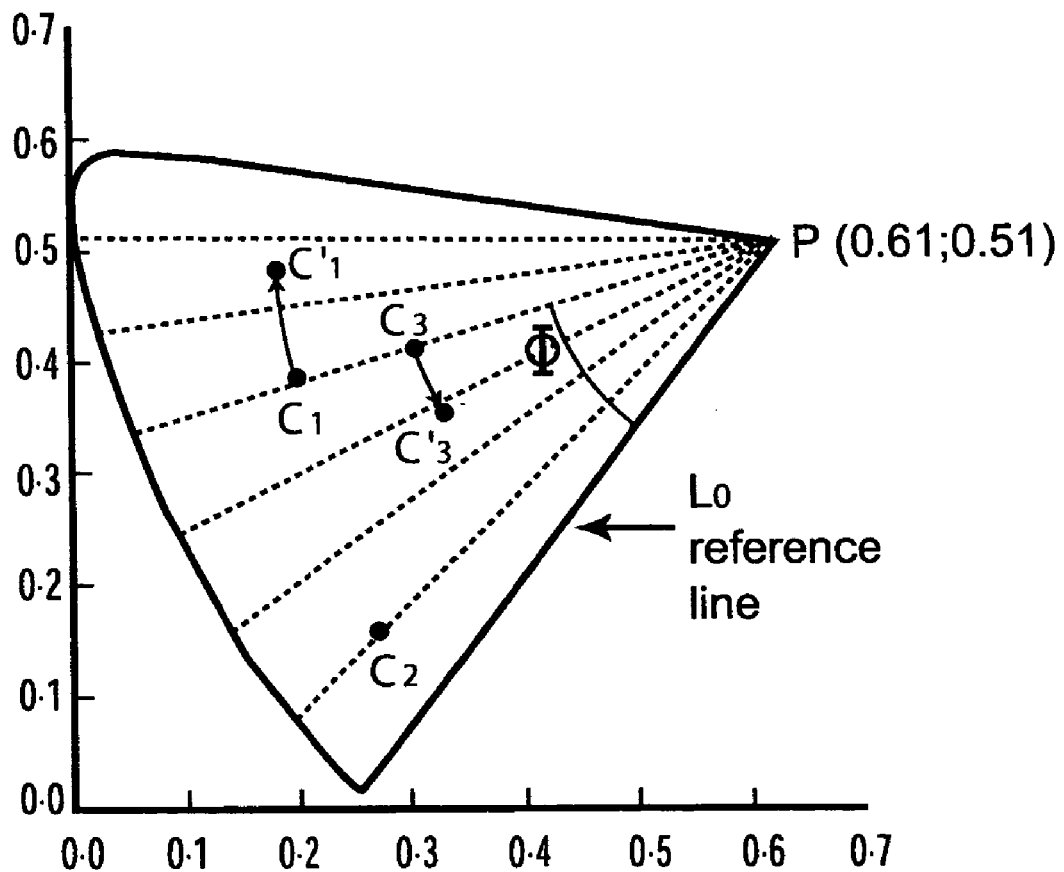
FIG. 2 shows confusion lines for an observer suffering from a type of colour-blindness in the CIE Yu*v* colour space.

In order to improve information access by a colour-blind person, it is important to know the type of colour blindness the person is suffering from. With this information, it is possible to predict which colours appear as indistinguishable. So-called confusion lines are shown in FIG. 2 in the CIE Yu*v* colour space for a protanope observer. For clarity, only a limited number of confusion lines is shown. In theory, there is an infinity of confusion lines in the shown part of the colour space. Colours that lie on a same confusion line will appear the same to a colour-blind person, like the colours $C_1$ and $C_3$. In order to render the colours $C_1$ and $C_3$ distinguishable from one another to a protanope observer, which would render the image shown in FIG. 1A understandable to this person, a colour conversion is needed.

An easy way of improving the colour distinction is to change only one parameter characterising the colours of a digital colour image, such as the hue. In the case that the hue of all colours is shifted in a colour space, the situation could be somewhat improved for a person suffering from colour blindness. However, such a fixed transformation does not work properly for any image, because it could happen that colours that are difficult to distinguish are changed into other colours that are also difficult to distinguish. Even worse, it could be that colours that are clearly distinguishable are transformed into colours that are indistinguishable to a colour-blind observer.

The present invention is now explained with reference to FIG. 3 which is a flow diagram for a colour conversion method according to an embodiment of the invention. The conversion method can be applied to a digital image built up of pixels or to a digital image described by the use of a page description language such as postscript, pdf or pcl.

Figure 3:
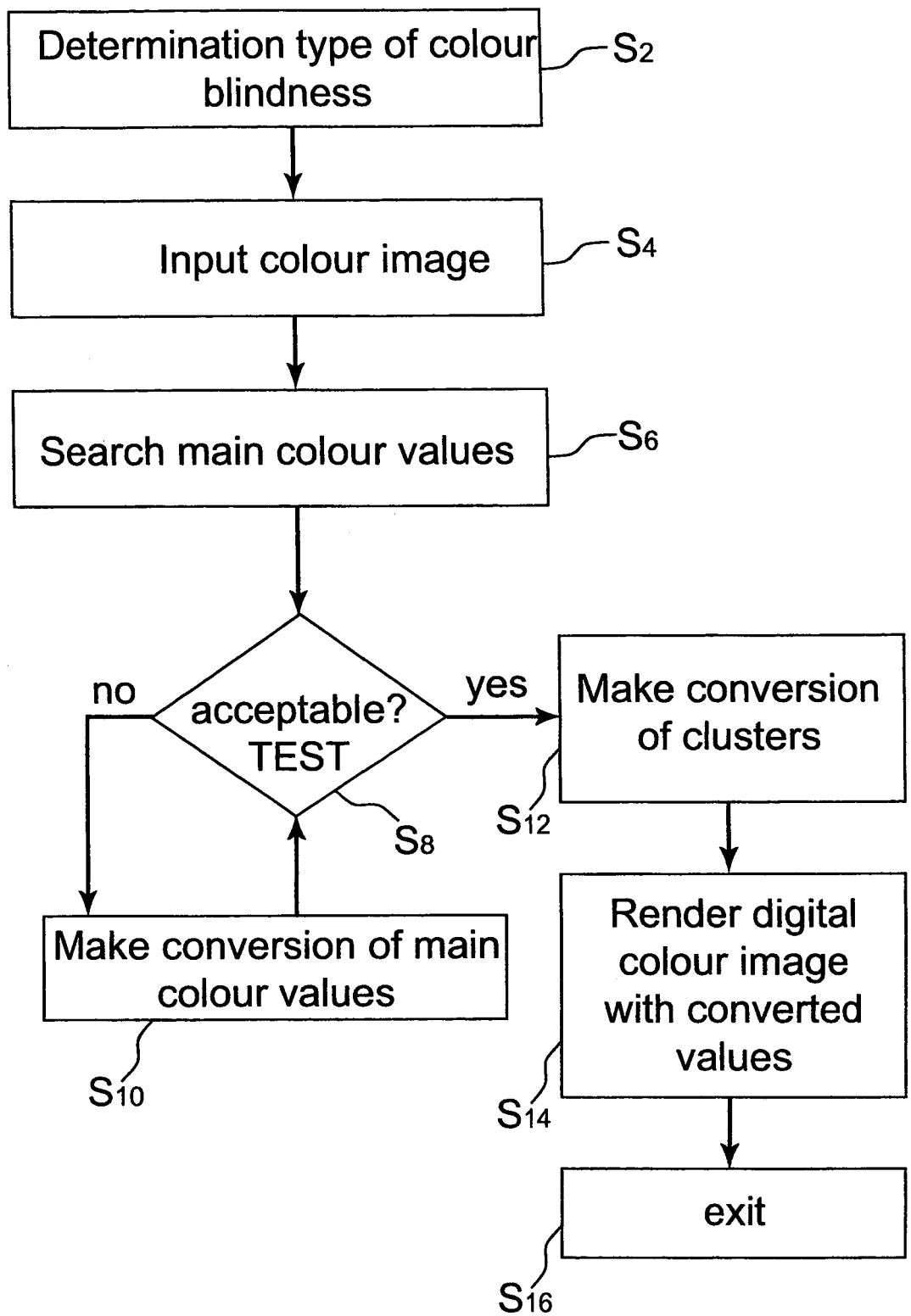
FIG. 3 is a flow diagram for a conversion method according to an embodiment of the invention.

Referring to FIG. 3, according to an embodiment of the present invention, the method of converting a digital colour image comprises the step $S_2$ of determining the type of colour-blindness the observer is suffering from. This can be done using a known test like the Ishihara test for colour blindness, which could for example bring to light that a person is a protanope. The result of the test can be entered in the form of data in the memory of a computer and be used by a program. Instead of performing the test for determining the type of colour-blindness the user is suffering from, it is possible to make use of selectable predetermined profiles for different types of colour-blindness. It is also possible to make use of a user profile, in which the characteristics of the vision deficiency of the user are stored.

In the step $S_4$, a digital colour image is imported, which image can be tored in a memory of a computer or other storage unit.

The step $S_6$ is performed to define a number of main colour values of the inputted digital colour image. This can be done by a cluster analysis, explained hereinafter, which analysis can be performed in a cluster module of a processing unit of a computer. Some digital images, such as a pie chart, contain a reduced number of colours and in this case, the main colours are easily defined as being the set of all colours in use in the digital image. Other images, however, may contain millions of different colours. In such a case, it is not convenient to calculate an adapted conversion for all these colours, because this would require considerable computing power. An analysis is therefore made of the colours occurring in the colour image. In many cases, groups of colours related to varying degrees are found to appear in the colour image and have the appearance of a cloud in a colour space, like the L*a*b* space. Such a cloud is hereinafter referred to as a cluster. A so-called cluster analysis may involve dividing the colour space in which the work is being carried out into a restricted number of sub-spaces each containing a cluster. A representative colour value is then selected for each cluster, for example by averaging the colours in the sub-space. Such a representative colour value is hereinafter referred to as a main colour value.

In some cases, it may happen that the found main colours are substantially distinguishable from each other to the colour-blind person (observer), in which case there is no need to modify the main colour values. In such a case, the main colour values found by the step $S_6$ are merely represented as 'converted main colour values'. In order to evaluate whether the main colour values have to be converted or not, a test (step $S_8$) is performed according to test parameters which are discussed hereinafter.

If it appears, as a result of the test $S_8$, that the main colour values are not distinguishable to the colour-blind person (observer), the step $S_{10}$ is performed in which the main colour values are converted. A good-working method of main colour value conversion involves making use of the confusion lines as for example shown in FIG. 2. In that example, the main colour values $C_1$ and $C_3$ lie on the same confusion line, indicating that these colour values are perceived equally by a protanope observer. The converted colour values of $C_1$ and $C_3$ are indicated respectively by $C'_1$ and $C'_3$. The colour value conversion step according to an embodiment of the method is such that $C'_1$ and $C'_3$ are positioned on different confusion lines. In this example, $C_2$ is the only main colour value on a confusion line. Therefore, there is no need to modify the value of $C_2$. The 'converted value' of $C_2$ is then simply $C_2$. If possible, care should be taken so that at most one converted main colour value is present on a confusion line in order to ensure satisfactory colour distinction for the colour-blind observer. As shown in FIG. 2, each of the converted main colour values $C'_1$, $C'_3$, and $C_2$ lies on a different confusion line. The colours of these converted main colour values are thus distinguishable by the colour-blind observer.

Then the test $S_8$ is performed again, and if the converted main colour values are considered acceptable according to test parameters which are discussed hereinafter, the colour values part of the clusters can be converted (step $S_{12}$) as well and the digital colour image can be rendered with the converted main colour values ($S_{14}$). Finally, the program can be exited (step $S_{16}$). The steps $S_4$, $S_6$, $S_8$, $S_{10}$, $S_{12}$ and $S_{14}$ can be carried out by running a computer program. The step $S_2$ may be carried out in part by running a computer program.

A main colour value is a representative colour value of a cluster, obtained for example by averaging the colours in the sub-space. In many cases, it is useful to convert not only the main colour values, but also the colour values being part of a cluster (step $S_{12}$). Here appears the main interest of using a cluster conversion. An increased processing speed can be achieved since a relatively simple conversion can be used for the colour values comprised in a cluster, while a more complex conversion of main colour values is done in order to obtain an optimized image for a user having a colour deficiency. The size of the cluster, characterised by the number $N_i$ of colour points present in that cluster i, can be taken into account. A relatively large cluster means that many colour points belong to that cluster. Therefore, such a cluster should have a relatively large influence on the final cluster positions. If all clusters, irrespective of their size, had the same influence, a relatively some cluster, or the occurrence of some noise colour points may be a source of a non-optimal cluster redistribution.

As can be seen in FIG. 2, the confusion lines all intersect at one point P, being called the confusion point. In the Yu*v* space, the co-ordinates of the confusion point P are (0.61; 0.51), as shown in the example of FIG. 2 for a protanope observer. A well-working method for the conversion of the main colour values is performing a conversion of the original angle $\Phi$ formed between a reference confusion line $L_0$ and a line connecting a main colour value to a confusion point. The converted angle, being the angle between the reference confusion line and a line connecting the corresponding converted main colour value to the confusion point, provides the position in a colour space of the main colour value with respect to the confusion lines.

To perform the step $S_8$, which tests whether the distribution of the main colour values is acceptable, the test parameters $\alpha_{min}$ and $\alpha_{max}$ can be chosen to be relevant parameters, as is explained hereinafter.

Figure 4A:
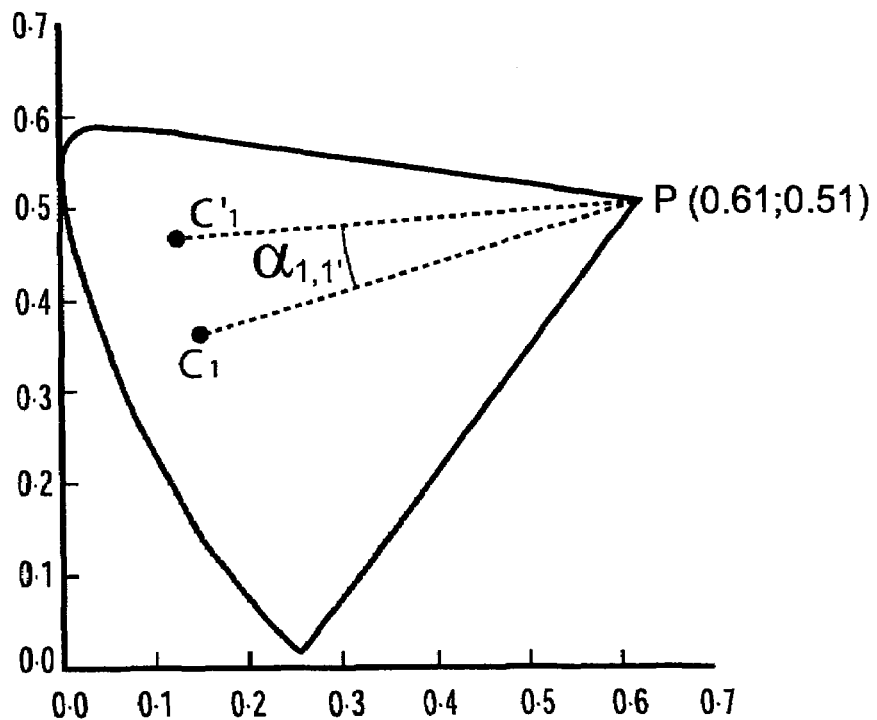
FIG. 4A illustrates the angle $\alpha_{1,1'}$ made between a line connecting the confusion point P to a main colour value $C_1$ and a line connecting the confusion point P to a corresponding converted main colour value $C'_1$.

The angle $\alpha_{i,i'}$ is the angle made between the line connecting the confusion point P to the main colour $C_i$ and the line connecting the confusion point P to the converted main colour value $C'_i$. An example of such an angle $\alpha_{1,1'}$ is shown in FIG. 4A for the main colour value $C_1$ and the converted main colour value $C'_1$. A requirement of the test could be that each angle $\alpha_{i,i'}$ should not exceed a chosen value $\alpha_{max}$. This ensures that the change of colour is not exaggerated.

Figure 4B:
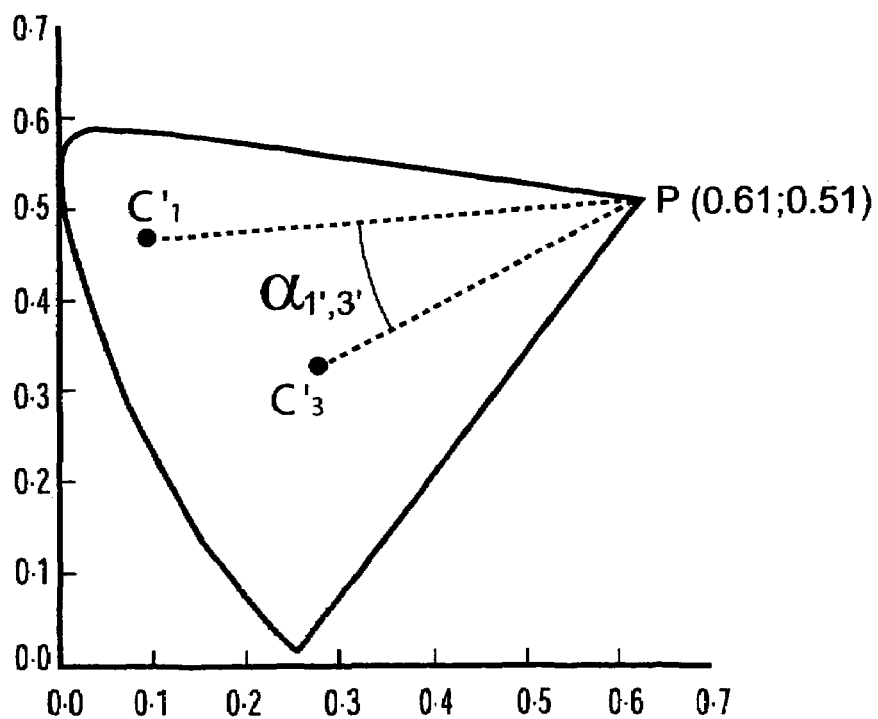
FIG. 4B illustrates the angle $\alpha_{1',3'}$ made between a line connecting the confusion point P to a converted main colour $C'_1$ and a line connecting the confusion point P to a converted main colour $C'_3$.

The angle $\alpha_{i',j'}$ is the angle made between the line connecting the confusion point P to the converted main colour value $C'_i$ and the line connecting the confusion point P to the converted main colour value $C'_j$. An example of such an angle $\alpha_{1',3'}$ is shown in FIG. 4B for the converted main colour values $C'_1$ and $C'_3$. A requirement of the test could be that each angle $\alpha_{i',j'}$ between two confusion lines comprising converted main colour values should be at least larger than $\alpha_{min}$. When the angle between these lines is larger than $\alpha_{min}$, these converted main colour values are considered to be distinguishable from each other.

When the test $S_8$ is performed with both test parameters $\alpha_{min}$ and $\alpha_{max}$ as explained above, colours that were originally indistinguishable are modified enough to render them distinguishable from one another for a colour-blind observer. Nevertheless, the change is not exaggerated and this ensures a good visual quality of the converted image for colour-blind people.

If it appears in the step $S_8$ that no conversion of the main colours (main colour values) can be done which satisfies the acceptance test with the originally chosen test parameters, for example when there are too many main colour values, then a possible solution is to modify the test parameters. For example, when the value $\alpha_{max}$ is chosen larger or the value $\alpha_{min}$ is chosen smaller, the test $S_8$ is less severe, and the conversion of the main colour values can become acceptable.

In some cases, it is preferred to maintain the original angle sequence of the main colour values. For line art like pie charts, it is not very critical, but for other documents, like photographs or maps, etc., it may be important. In maps, for example, the colour blue is used to represent water, while green is used to represent forests. A colour-blind person is used to this. Therefore, it is in such cases recommendable not to deviate too much from the original colours. One of the most important features is that colours are made sufficiently distinguishable from each other for the user.

Figure 5A:
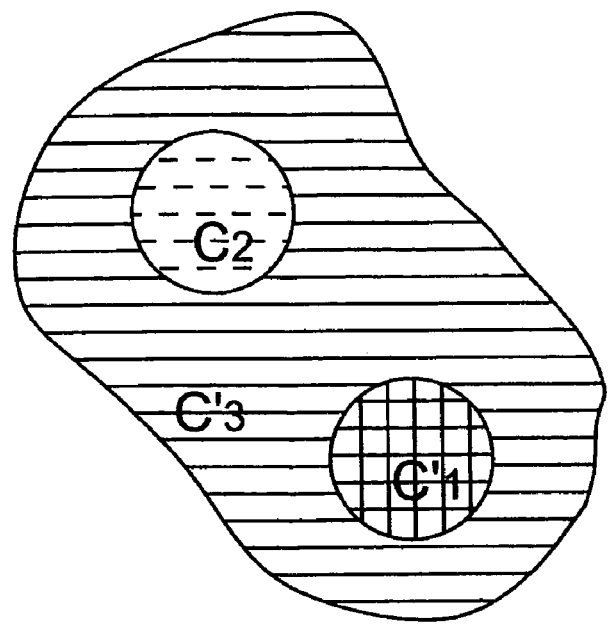
FIG. 5A is an example of a colour image after a conversion applied to the colours of the image shown in FIG. 1A.
Figure 5B:
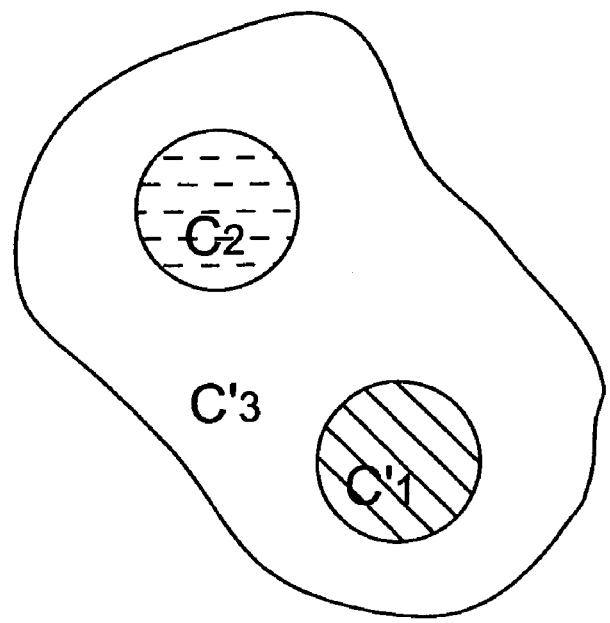
FIG. 5B illustrates how the colour image is perceived after the conversion by an observer suffering from a type of colour-blindness.

The colour the final result is illustrated in FIG. 5A, being the colour image shown in FIG. 1A, after the conversion of the present invention. FIG. 5B illustrates how the colour image is perceived after the colour conversion by an observer suffering from a type of colour-blindness. The converted main colour values are visible in FIG. 5A and are $C'_1, C'_2, C'_3$. Originally, the colours $C_1$ and $C_3$ were the colours that were indistinguishable to the colour-blind observer. After transformation according to the present invention, the colours $C'_1, C'_2, C'_3$, are distinguishable to this observer, as illustrated in FIG. 5B. As explained above, these main colour values are well suited to render a digital colour image for the colour-blind observer because care has been taken so that at most one main colour value is positioned on one confusion line.

To improve the final result, the lightness Y can be modified, which permits to create more contrast between the converted main colour values.

Figure 6:
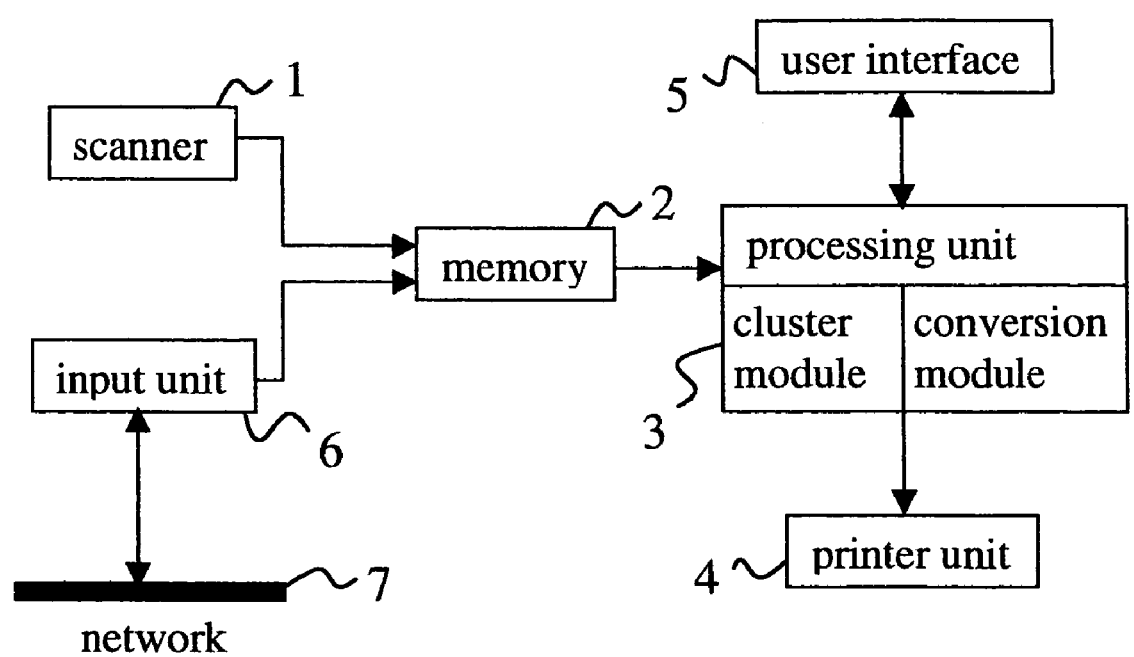
FIG. 6 is a block diagram of a digital printer usable in the present invention.

FIG. 6 shows a diagrammatic representation of parts of a digital printer to which the invention as described above can be applied. Other types of devices can also be used.

Referring to FIG. 6, the apparatus of the present invention is provided with a user interface 5 and an input unit 6 for receiving digital images made elsewhere, e.g. via a network 7, so that the apparatus is used as a printer.

The apparatus is also provided with a scanner 1 for converting a recorded image to a digital image, a memory 2 for storing the digital image, a processing unit 3 for processing the digital image and a printing unit 4 for printing the processed digital image on paper or any suitable medium. All the components of the apparatus are coupled operatively. The apparatus is also suited for use as a photocopier. For printing digital colour images, the printing unit 4 contains a number of colour printing sub-units, each printing a basis colour. For example, four colour printing sub-units use the basis colorants cyan, yellow, magenta and black in the form of ink or toner. Colours are rendered with raster techniques such as dithering or error diffusion.

The input image originating from the scanner 1 or the input unit 6 is a colour image containing colours that might be indistinguishable to a user suffering from some type of colour blindness. To make a converted print, the processing unit 3 is provided with a cluster module for searching the main colour values and a conversion module for converting the colours of an image to a converted colour values according to the invention. That is, the steps of the colour conversion method in FIG. 3 are implemented by the cluster module and the conversion modules which may be computer programs embodied on a computer-readable medium such as a disc or internal memory of the computer having the processing unit 3. In this regard, the processing steps of the present method are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

The processing unit 3 is connected to the operating unit 5, being a user interface. The operator interface 5 comprises a selection mechanism for switching on or off the conversion of a digital colour image according to the invention, and may possibly be also provided with a setting mechanism for manually setting some parameters of the conversion function, for example by means of a slide or button, to indicate which type of colour-blindness should be taken into account. In an environment with different people suffering from a different type of colour-blindness, a parameter that can be given for the conversion function is the identification of the colour-blind user or observer to whom the document is destined. This automatic setting is possible if the type of colour-blindness the person is suffering from is already stored in a memory of the system, such as the memory 2. Otherwise, the type of colour blindness of a specific person is provided by means of the user interface 5 to perform the manual setting of some parameters. Also, the user interface 5 may be provided with a reproducing unit, for example a monitor, by means of which the user can interactively access the result of the automated conversion.

When the invention is used in a printer in a network environment, the user can, for example, indicate by means of the printer driver at his workstation that a colour image must be converted for a colour-blind observer and then printed with the converted colours. In that case, a processing device in the printer converts the digital colour image to a digital colour image with improved colour distinction for a colour-blind user, and prints the converted image.

It is also possible to carry out the colour conversion in a separate computer, for example the workstation of a user, and then send the converted digital image to a printer or store it in a mass memory.

Although the invention has been explained by reference to the above-described exemplified embodiment, it is not limited thereto. It will be clear to the skilled person that other embodiments are possible within the scope of the claims.

The invention claimed is:

1. A method of converting a digital colour image having colour values to a digital colour image for an observer suffering from a colour-blindness, the method comprising the steps of:
    defining a number of main colour values of a digital colour image;
    converting the main colour values to different main colour values by using a distribution of the main colour values with respect to confusion lines in at least a part of a colour space such that the converted main colour values are perceived as distinguishable from each other by said observer; and
    rendering the digital colour image with the converted main colour values,
    wherein in the defining step, the main colour values are determined by a cluster analysis of the colours of the digital colour image, a main colour value being a representative of the colour values in a cluster.

2. The method of converting a digital colour image according to claim 1, further comprising the step of:
    determining a type of the colour-blindness of said observer.

3. The method of converting a digital colour image according to claim 1, wherein the colour values in a cluster are converted cluster colour values.

4. The method of converting a digital colour image according to claim 1, wherein the distribution of the main colour values with respect to confusion lines in at least a part of a colour space is taken into consideration for converting the main colour values, each of said confusion lines comprising colour values which are perceived as indistinguishable from each other by an observer suffering from a type of colour-blindness.

5. The method of converting a digital colour image according to claim 4, wherein the distribution of the converted main colour values with respect to the confusion lines is such that no more than one converted main colour value is allocated on a confusion line.

6. The method of converting a digital colour image according to claim 4, wherein the conversion of the main colour values is performed according to a conversion function which allocates to an angle formed between a reference confusion line and a line connecting a main colour value to a confusion point, the confusion point being a point where the confusion lines intersect, a converted angle being the angle between the reference confusion line and a line connecting the corresponding converted main colour value to the confusion point.

7. The method of converting a digital colour image according to claim 6, wherein the original angle sequence of the main colour values is maintained for the converted main colour values.

8. The method of converting a digital colour image according to claim 6, wherein the conversion function is dependent on an image type recognized by analysing the distribution of the main colour values.

9. The method of converting a digital colour image according to claim 6, wherein the conversion function allocates a weight to each main colour value, depending on the number of colour points present in the cluster having said main colour value as representative, the weight determining the type of conversion applied to each main colour value.

10. The method of converting a digital colour image according to claim 1, wherein a lightness of the converted main colour values is such that the contrast between the converted main colour values is optimized for said observer.

11. An apparatus for converting a digital colour image having colour values to a digital colour image for an observer suffering from a colour-blindness, the apparatus comprising:
    a memory to store a digital colour image;
    a processing unit to process the digital colour image, the processing unit including,
        a cluster module to define a number of main colour values of the digital colour image, wherein the main colour values are determined by a cluster analysis of the colours of the digital colour image, a main colour value being a representative of the colour values in a cluster, and
        a conversion module to convert the main colour values to different main colour values by using a distribution of the main colour values with respect to confusion lines in at least a part of a colour space such that the converted main colour values are perceived as distinguishable from each other by said observer; and
    a unit to render the digital colour image with the converted main colour values.

12. The apparatus for converting a digital colour image according to claim 11, further comprising:
    an analysis module for determining a type of the colour-blindness of said observer.

13. The apparatus for converting a digital colour image according to claim 11, further comprising:
    a colour mapping module for establishing a position in a part of the colour space of the main colour values and of converted main colour values with respect to confusion lines.

14. An apparatus for converting a digital colour image having colour values to a digital colour image for an observer suffering from a colour-blindness, the apparatus comprising:
    means for defining a number of main colour values of a digital colour image;

means for converting the main colour values to different main colour values by using a distribution of the main colour values with respect to confusion lines in at least a part of a colour space such that the converted main colour values are perceived as distinguishable from each other by said observer; and means for rendering the digital colour image with the converted main colour values, wherein the main colour values are determined by a cluster analysis of the colours of the digital colour image, a main colour value being a representative of the colour values in a cluster.

15. A computer program product embodied on at least one computer-readable medium, for converting a digital colour image having colour values to a digital colour image for an observer suffering from a colour-blindness, the product comprising computer-executable instructions for:

defining a number of main colour values of a digital colour image;

converting the main colour values to different main colour values by using a distribution of the main colour values with respect to confusion lines in at least a part of a colour space such that the converted main colour values are perceived as distinguishable from each other by said observer; and rendering the digital colour image with the converted main colour values, wherein the main colour values are determined by a cluster analysis of the colours of the digital colour image, a main colour value being a representative of the colour values in a cluster.

16. The computer program product according to claim 15, further comprising computer-executable instructions for:

determining a type of the colour-blindness of said observer.

17. The computer program product according to claim 15, wherein a distribution of the main colour values with respect to confusion lines in at least a part of a colour space is taken into consideration for converting the main colour values, each of said confusion lines comprising colour values which are perceived as indistinguishable from each other by an observer suffering from a type of colour-blindness.

18. The computer program product according to claim 17, wherein the distribution of the converted main colour values with respect to the confusion lines is such that no more than one converted main colour value is allocated on a confusion line.

19. The computer program product according to claim 17, wherein the conversion of the main colour values is performed according to a conversion function which allocates to an angle formed between a reference confusion line and a line connecting a main colour value to a confusion point, the confusion point being a point where the confusion lines intersect, a converted angle being the angle between the reference confusion line and a line connecting the corresponding converted main colour value to the confusion point.

20. The computer program product according to claim 17, wherein the conversion function is dependent on an image type recognized by analysing the distribution of the main colour values.

21. The computer program product according to claim 17, wherein the conversion function allocates a weight to each main colour value, depending on the number of colour points present in the cluster having said main colour value as representative, the weight determining the type of conversion applied to each main colour value.

22. A printer provided with a network connection unit for receiving externally generated print orders, a processing unit for processing digital image data and a printing unit, wherein the processing unit is provided with an apparatus for converting a digital colour image for an observer suffering from a colour-blindness, the apparatus comprising:

a memory to store a digital colour image; and a processing unit to process the digital colour image, the processing unit including, a cluster module to define a number of main colour values of the digital colour image, wherein the main colour values are determined by a cluster analysis of the colours of the digital colour image, a main colour value being a representative of the colour values in a cluster, and a conversion module to convert the main colour values to different main colour values by using a distribution of the main colour values with respect to confusion lines in at least a part of a colour space such that the converted main colour values are perceived as distinguishable from each other by said observer, wherein the printer renders the digital colour image with the converted main colour values.

23. An image display device provided with a display screen, and a processing unit for processing digital image data, wherein the processing unit is provided with an apparatus for converting a digital colour image for an observer suffering from a colour-blindness, the apparatus comprising:

a memory to store a digital colour image; and a processing unit to process the digital colour image, the processing unit including, a cluster module to define a number of main colour values of the digital colour image, wherein the main colour values are determined by a cluster analysis of the colours of the digital colour image, a main colour value being a representative of the colour values in a cluster, and a conversion module to convert the main colour values to different main colour values by using a distribution of the main colour values with respect to confusion lines in at least a part of a colour space such that the converted main colour values are perceived as distinguishable from each other by said observer, wherein the image display device renders the digital colour image with the converted main colour values.

* * * * *